US011875380B2

(12) United States Patent
Khan et al.

(10) Patent No.: US 11,875,380 B2
(45) Date of Patent: *Jan. 16, 2024

(54) METHOD FOR MATCHING INFLUENCERS TO BRANDS AND PAIRING INFLUENCER VIDEOS TO PRODUCTS FOR INTRA-VIDEO TRANSACTIONS

(71) Applicant: Zipline Live, Inc., St. Louis, MO (US)

(72) Inventors: Faaiz Khan, St. Louis, MO (US); Jesse Dunlap, St. Louis, CA (US); Kirk A. Bowman, St. Louis, MO (US)

(73) Assignee: Zipline Live, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,797

(22) Filed: Jun. 29, 2021

(65) Prior Publication Data

US 2021/0357977 A1 Nov. 18, 2021

Related U.S. Application Data

(63) Continuation of application No. 16/882,661, filed on May 25, 2020, now Pat. No. 11,080,746.

(60) Provisional application No. 62/895,485, filed on Sep. 3, 2019.

(51) Int. Cl.
*G06Q 30/00* (2023.01)
*G06Q 30/0251* (2023.01)
*G06Q 30/0241* (2023.01)

(52) U.S. Cl.
CPC ..... *G06Q 30/0253* (2013.01); *G06Q 30/0252* (2013.01); *G06Q 30/0269* (2013.01); *G06Q 30/0277* (2013.01)

(58) Field of Classification Search
None
See application file for complete search history.

(56) References Cited

U.S. PATENT DOCUMENTS

| 2008/0208682 | A1* | 8/2008 | Chandley | G06Q 30/0247 705/14.46 |
| 2014/0019266 | A1* | 1/2014 | Stoliartchouk | G06Q 30/02 705/14.73 |
| 2016/0034935 | A1* | 2/2016 | Neb | G06Q 30/0214 705/14.16 |

(Continued)

*Primary Examiner* — Naresh Vig
(74) *Attorney, Agent, or Firm* — Run8 Patent Group, LLC; Peter Miller; Leah Raddatz (57) ABSTRACT

A method for generating advertising content includes: during a content creation period, receiving a video advertisement from an entity; packaging the video advertisement with a pointer to the entity and a checkout portal for content linked to the video advertisement to generate an augmented video advertisement; during a live period succeeding the content creation period, for a first instance of the augmented video advertisement accessed at a first computing device associated with a first user, associating a first purchase completed within the checkout portal of the first instance of the augmented video advertisement with the entity based on the pointer; and, for a second instance of the augmented video advertisement accessed at a second computing device associated with a second user, associating a second purchase completed within the checkout portal of the second instance of the augmented video advertisement with the entity based on the pointer.

21 Claims, 5 Drawing Sheets

(56) References Cited

U.S. PATENT DOCUMENTS

2018/0260844 A1* 9/2018 Goldstein ............. H04L 67/306
2019/0347685 A1* 11/2019 Glazier ................ H04L 67/535

* cited by examiner

METHOD FOR MATCHING INFLUENCERS TO BRANDS AND PAIRING INFLUENCER VIDEOS TO PRODUCTS FOR INTRA-VIDEO TRANSACTIONS

CROSS-REFERENCE TO RELATED APPLICATIONS

This Application is a continuation application of U.S. patent application Ser. No. 16/882,661, filed on 25 May 2020, which claims the benefit of U.S. Provisional Application No. 62/895,485, filed on 3 Sep. 2019, each of which is incorporated in its entirety by this reference.

TECHNICAL FIELD

This invention relates generally to the field of digital marketing and more specifically to a new and useful method for matching influencers to brands and pairing influencer videos to products for intra-video transactions in the field of digital marketing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1, 3A, 3B, and 4, a method S100 for connecting a third-party (hereinafter a brand influencer or "influencer") to particular brands includes: during a matching period, receiving a set of opportunities from brands at instances of a brand portal in Block S110; serving the set of opportunities to an influencer in a population of influencers at an instance of an influencer portal based on characteristics of the set of opportunities in Block S120; receiving a first selection of a first opportunity in the set of opportunities from the instance of the influencer portal in S130; calculating a predicted match score for a first pairing between the influencer and the first opportunity based on predefined opportunity metrics and influencer characteristics in Block S140; in response to the predicted match score exceeding a threshold match score, prompting the influencer to record a first video advertisement for the first opportunity in Block S150; during a content creation period succeeding the matching period, receiving the first video advertisement from the influencer in Block S152; packaging the first video advertisement with a pointer to the influencer and a checkout portal for product linked to the first opportunity to generate a first augmented video advertisement in Block S160; preparing the first augmented video advertisement for publication to an online destination in Block S170; and, during a live period succeeding the content creation period, associating purchases within instances of the checkout portal with the influencer based on the pointer in Block S180.

One variation of the method S100 includes: during a matching period, receiving a set of opportunities from brands at instances of a brand portal in Block S110; serving the set of opportunities to a first influencer in a population of influencers at an instance of an influencer portal based on characteristics of the set of opportunities in Block S120; receiving a first selection of a first opportunity in the set of opportunities from the instance of the influencer portal in Block S130; calculating a match score for a first pairing between the first influencer and the first opportunity based on opportunity characteristics and influencer characteristics in Block S140; in response to the predicted match score exceeding a threshold match score, prompting the first influencer to record a first video advertisement for the first opportunity in Block S150; during a content creation period succeeding the matching period, receiving the first video advertisement from the first influencer in Block S152; packaging the first video advertisement with a pointer to the first influencer and a visual element for tracking user interactions to generate a first augmented video advertisement in Block S160; returning the first augmented video advertisement, packaged with the pointer and the visual element, to the instance of the influencer portal for publication within an online network in Block S170; and, during a live period succeeding the content creation period, associating advertising outcomes with the first influencer based on user interactions recorded at the visual element and the pointer in Block S190.

As shown in FIGS. 2, 3A, 3B, and 4, one variation of the method S100 includes, during a content creation period: receiving a video advertisement, from a first entity, associated with a first brand in Block S152; packaging the video advertisement with a set of features—including a first pointer to the first entity and a checkout portal for content linked to the video advertisement—to generate an augmented video advertisement in Block S160; and preparing the augmented video advertisement, packaged with the pointer and the checkout portal, for publication to an online destination in Block S170. In this variation, the method S100 further includes, during a live period succeeding the content creation period: for a first instance of the augmented video advertisement accessed at a first digital platform and executing on a first computing device associated with a first user, associating a first purchase—completed within the checkout portal of the first instance of the augmented video advertisement—with the first entity based on the pointer in Block S180; and, for a second instance of the augmented video advertisement accessed at a second digital platform and executing on a second computing device associated with a second user, associating a second purchase—completed within the checkout portal of the second instance of the augmented video advertisement—with the first entity based on the pointer in Block S180.

2. Applications

Generally, the method S100 can be executed by a computer system to: connect influencers to particular opportunities—hosted by brands—most relevant to these influencers based on characteristics of these brands, characteristics of products associated with these brands, and characteristics of followers, demographics, and historical influence data of these influencers; host a pathway for distributing internal content related to an opportunity between a brand and an influencer who has committed to this opportunity; package visual content uploaded by the influencer, a pointer or link back to the influencer, and a checkout portal for purchasing a product presented in this visual content into a shoppable video or advertisement for the opportunity (e.g., a video advertisement or video content for general consumer consumption and configured to host an in-video purchase; and return this shoppable video or advertisement (hereinafter "the advertisement") to the influencer for publication onto an online destination or online platform (e.g., a video-sharing website, a photo or video-sharing social networking service, an online social media service, a blog, a website and/or a social networking service). Later, once the influencer has published the advertisement to an online destination, the computer system can execute Blocks of the method S100 to: host instances of the checkout portal for the influencer's followers and other users who select the published advertisement; complete checkout processes for followers and users purchasing the product presented in the advertisement; associate these purchases (and other engagements with the advertisement) with the influencer based on a pointer (e.g., a UUID) associated with the influencer and packaged by the computer system into this advertisement; and support, host, or manage compensation from the brand to the influencer according to terms defined for first the opportunity and performance of the advertisement (e.g., purchases through, views of, and/or other engagement with the advertisement).

More specifically, the computer system can serve, distribute, or expose product opportunities—uploaded to the computer system by various brands—to particular influencers based on product type outlined in these opportunities, target outcomes (e.g., purchases, brand lift) of these opportunities, influencer or follower demographic information, and/or influencer reach, etc. In response to an influencer selecting a particular opportunity and meeting a threshold criteria for accepting the opportunity, such as defined in terms specified for the particular opportunity by the corresponding brand, the computer system can automatically: prompt the brand to confirm the influencer; present or expose content supplied by the brand for the opportunity to the influencer within the influencer's portal; and/or trigger mailing of physical content (e.g., a physical product) associated with the opportunity to a mailing address in the influencer's profile. The computer system can also enable tools for uploading new digital content (e.g., video clips, still images, audio clips), recording new digital content, accessing digital content provided by the brand for the opportunity (e.g., a fact sheet, a list of talking points, and/or stock images of the product), and/or compiling these digital content into a new advertisement for the particular opportunity. The computer system can then: package the new advertisement with a pointer to the influencer (e.g., a unique influencer ID) and a link to a checkout portal (or an integrated, responsive checkout portal); enable the influencer to download this new advertisement for manual publication to an online destination; and/or automatically publish this new advertisement to one or more online destinations, such as responsive to manual confirmation by the influencer.

For example, a particular brand may upload a new opportunity to the computer system via an instance of the brand portal. The computer system can then: load the new opportunity into a set of pending opportunities: and sort or score the new opportunity—in this set of opportunities—for a particular influencer based on: target outcomes of the new opportunity, a compensation schema of the new opportunity, characteristics of a product (or service) described in the new opportunity, and/or influencer characteristic preferences defined by the brand for the new opportunity (hereinafter "opportunity metrics"); and/or characteristics of the particular influencer, characteristics of the particular influencer's followers, and/or historical performance (e.g., number of followers reached by an advertisement, click-through conversion rates, conversion rates for particular product categories) of the particular influencer's content (hereinafter "influencer metrics"). The computer system can then expose or present this new opportunity to the particular influencer—via her influencer portal—if a rank or score of the new opportunity exceeds a threshold rank or score, such as in (near) real-time upon receipt of the new opportunity or if this new opportunity is still pending once the particular influencer has fewer than a maximum number of (e.g., four) opportunity commitments.

In this example, upon receipt of this new opportunity, the computer system can also: initially identify a target group of influencers for whom the new opportunity may be most relevant (e.g., most likely to be selected by these influencers and confirmed by the particular brand) based on the opportunity metrics assigned to the new opportunity and influencer metrics of these influencers; and then prompt these influencers—via the influencer portal—to review and confirm the new opportunity (e.g., sequentially, starting with a particular influencer for whom the new opportunity is predicted to be most relevant and moving to a next influencer if a previous influencer declined the new opportunity). Therefore, the computer system can streamline connecting brands and products sold by these brands to target influencers who fit certain criteria for advertising these products, such as histories of strong performances (e.g., high click-through or conversion rates) for similar brands, products, opportunities, or opportunity metrics. More specifically, by executing Blocks of the method S100, the computer system can filter, rank, or prioritize opportunities served to influencers based on opportunities most relevant to these influencers and most likely to be confirmed by corresponding brands, thereby: reducing time from publication of a new opportunity to review and selection of the new opportunity by at least one influencer; maintaining high rates of acceptance of influencers who selected opportunities on this platform by brands that uploaded these opportunities; and streamlining and shortening time from publication of new opportunities to the platform to publication of digital video advertisements for these opportunities by influencers.

The computer system can also: record outcomes of a video advertisement generated by an influencer for a particular opportunity, such as user views, click-throughs, and purchases on this video advertisement; leverage a pointer to the influencer and a checkout portal packaged with this video advertisement by the computer system to link these outcomes directly to the influencer (or to the influencer's profile); and thus track performance metrics of the influencer's video advertisement and value created by the video advertisement for the brand. Therefore, the computer system can: enable the corresponding brand to access explicit data relating to influencers and video advertisements that lead to target outcomes for the opportunity; and automatically manage compensation between brands and influencers—such as according to predefined compensation schema defined in these opportunities—based on these outcomes of video advertisements thus published by these influencers via this platform. Additionally, by packaging video advertisements generated by the influencer with the pointer to the influencer, the computer system can track performance metrics of video advertisements generated by this influencer across multiple online platforms (e.g., many online social media platforms, forums, new sites, mobile applications) regardless of the publisher. Therefore, for an advertisement generated by the influencer and shared by many publishers across numerous online platforms, the computer system can attribute outcomes—such as views, clicks, and purchases—occurring at every instance of this advertisement published across these online platforms to the original influencer.

Additionally, the computer system enables brands and influencers to consider predictions of outcomes before accepting influencer-opportunity matches, such as based on a model linking opportunity metrics and influencer history to certain outcomes (e.g., viewability, click-through, conversion) specified for these opportunities. By generating these predictions and returning these predictions to influencers and/or brands for new opportunities uploaded to the platform, the computer system can enable influencers to view predicted compensation (or "earnings") associated with particular influencer-opportunity matches or to view a predicted reach (e.g., a number of new followers) of video advertisements generated by the influencer for a particular opportunity while also enabling brands insight into predicted sales or predicted brand lift for an opportunity allocated to a particular influencer. Over time, the computer system can also develop and refine a model linking influencer characteristics, influencer metrics, opportunity metrics, and opportunity outcomes for individual influencers, clusters of similar influencers, and/or all influencers on the platform as the computer system collects outcome data for new opportunities and related video advertisements on the platform over time and then leverage this refined model to improve outcome predictions for future opportunities.

Furthermore, by packaging a video advertisement with a checkout portal, the computer system enables "in-video" purchase of (a physical and/or digital) product presented in this advertisement. Therefore, rather than routing all users viewing instances of this advertisement to a different webpage or portal for initiating purchase of this product, the computer system can instead: enable users to purchase the product (or "checkout") directly within these instances of the advertisement; and definitively attribute each of these purchases (and views of the advertisement, and failed conversions within the checkout portal) to the influencer who originally created the advertisement.

Additionally, in completing transactions at the augmented video advertisement, the computer system can promote a better experience for users, influencers, and brands by: limiting duration from viewing the advertisement to completion of a purchase; eliminating a need to navigate to a second online checkout location to complete a purchase; eliminating a need to search for the product at the second online checkout location; and reducing probability of failed conversions due to overchoice and visibility of additional products at the second online checkout location for users. Thus, by reducing effort required by a user to complete a transaction and concentrating the user's attention to the product in the form of an engaging influencer-generated video advertisement, the computer system can: reduce complexity for the user; increase user purchase confidence (and reduce potential for buyer's remorse); and therefore increase probability of conversion. By therefore increasing probability of conversion by a user viewing the advertisement and directly attributing such conversion to the appropriate influencer who generated the advertisement, the computer system can both improve outcomes for the brand and streamline compensation of the influencer for higher-quality, more engaging content.

3. Terms

As described above, an "influencer" is referred to herein as a third-party content creator distinct from a brand and who generates media for publication on an online platform, such as video advertisements on behalf of various brands. For example, the influencer may "influence" the purchasing decisions of users (or "followers") viewing video advertisements published to the online platform by the influencer. Thus, an influencer may generate and publish media in order to persuade users to purchase a particular product or products affiliated with a particular brand.

In one variation, an influencer represents a third-party content creator associated with a minimum number of followers on an online platform or across multiple online platforms (e.g., an online blog, a photo or video-sharing social networking service). Additionally or alternatively, an influencer can represent: a third-party content creator exhibiting a level of knowledge in a particular field or topic related to content generated by the influencer; and/or a third-party content creator associated with a particular brand, product, and/or topic and publishes media to one or more online platform on behalf of this brand or product or according to this topic.

As described above, a "brand" is referred to herein as a source of a particular product or products. For example, a brand may partner with an influencer to generate a video advertisement for the brand and/or a particular product affiliated with the brand.

As described above, a "user" is referred to herein as a consumer of a video advertisement. For example, a user may access a particular online platform and watch a video advertisement published by an influencer and/or brand on the particular online platform. Additionally, the user may purchase a product or products advertised in the video advertisement via the checkout portal within the video advertisement.

In one variation, a user represents a "follower" of a particular influencer on an online platform. For example, a follower may elect to view (or "follow") media created by a particular influencer on an online platform (e.g., an online blog, a photo or video-sharing social networking service), and thus may view video advertisements generated by this particular influencer and published on the online platform.

As described above, a "video advertisement" is referred to herein as a digital video: including content related to a particular product or products affiliated with a particular brand; generated by an influencer in order to persuade users to purchase the particular product or products; and configured for publication on an online platform.

4. Example: Influencer-Brand Pair

In one example, a particular brand may specify a new opportunity and upload the new opportunity via an instance of a brand portal. The particular brand may specify a set of opportunity metrics for the new opportunity including: characteristics of a product (or service) described in the new opportunity, a budget for the new opportunity, a compensation schema of the new opportunity, target outcomes of the new opportunity, target number of followers reached by an advertisement, target demographics of users reached by an advertisement, and/or limitations for an influencer based on characteristics of the influencer. The computer system can then load the new opportunity and the opportunity metrics defined by the brand via the instance of the brand portal and sort the opportunity into a catalog for viewing via instances of an influencer portal.

In this example, an influencer may access an instance of an influencer portal at a webpage or native application executing on her computing device (e.g., her smartphone). The computer system can prompt the influencer—via the influencer portal—to generate an influencer profile containing influencer characteristics and performance history including: a number and/or types of online destinations in which the influencer previously published branded and/or unbranded content; a number the influencer's followers on each of these online destinations; brands and opportunities previously committed to by the influencer; location and demographics of the influencer; locations and demographics of the influencer's followers; the influencers interests and areas of expertise; etc. Once the influencer has generated an influencer profile, the computer system can serve a subset of opportunities, from the set of opportunities to the influencer via the instance of the influencer portal. The influencer may sort and/or filter the subset of opportunities (e.g., based on her interests and/or preferences), and the computer system can receive a selection of a particular opportunity in the subset of opportunities from the influencer via the instance of the influencer portal. Upon receiving the selection of the particular opportunity from the first influencer, the computer system can serve the influencer profile to the brand associated with a link or pointer to the particular opportunity via an instance of the brand portal for verification of the influencer by the brand.

Upon receiving verification of the influencer from the brand via the instance of the brand portal, the computer system can present or expose visual content generation tools (e.g., product fact sheets, stock images of products) received from the brand via the instance of the brand portal to the influencer via the instance of the influencer portal, thereby enabling the influencer to create advertising content for the particular opportunity. The computer system can also: receive advertising content from the influencer via the instance of the influencer portal, such as in the form of a video; and package the advertising content with a pointer to the influencer and a checkout portal—for purchasing or accessing additional content linked to the particular opportunity—into a packaged advertisement. The computer system can then: return the packaged video advertisement to the influencer to manual uploading to an online platform by the influencer; return the packaged advertisement to an associate of the brand for distribution; or automatically distribute this packaged advertisement to one or more online platforms on behalf of the influencer.

Later, a user (e.g., one of the influencer's followers) may view the packaged advertisement at an online platform within a web browser or within a native application. When the user selects or swipes across a portion of the advertisement, the packaged advertisement can automatically open a checkout portal to purchase a unit of the advertised product or to learn more about the advertised product or service. The packaged advertisement (or the computer system) can record this selection or subsequent purchase by the user and pair this selection or purchase with the pointer to the influencer. The computer system can then update influencer metrics for this opportunity in the influencer's profile to reflect this selection or purchase and update compensation for the influencer according to these metrics and a compensation model assigned to the opportunity At a later time, when a new opportunity is uploaded to the platform, the computer system can: access influencer metrics contained in the influencer's profile, which reflects outcomes data for early opportunities completed by the influencer; access characteristics of these opportunities and related brands; extract opportunity and brand characteristics for this new opportunity; and predict outcomes of a new advertisement generated by the influencer for this new opportunity based on these influencer metrics, opportunity characteristics, and brand characteristics. The computer system can then selectively recommend the new opportunity to the influencer based on this predicted outcome.

Therefore, the computer system can implement closed-loop controls to: incorporate influencer pointers and checkout portals into visual content uploaded by the influencer for various opportunities; leverage these pointers and checkout portals to link user interactions within these visual content to the user; predict outcomes of new opportunities completed by the user; and selectively recommend new opportunities to the influencer user based on these predictions, thereby improving efficiency and effectiveness in reaching users and increasing conversions for both the influencer and brands.

5. Influencer Portal

The computer system enables influencers to generate advertising content publishable across a myriad of online platforms (e.g., social media networks, a native platform or application) and directly obtain attribution and recognition for purchases and/or other target outcomes achieved within advertisements created by these influencers.

5.1 Influencer Profiles

Within a distributed influencer network in which influencers (e.g., individuals capable of influencing potential buyers of a product) connect with brands to advertise their products, a computer system can receive opportunities specified by brands via instances of a brand portal and serve a subset of these opportunities to influencers via instances of an influencer portal. More specifically, the computer system can selectively serve the subset of these opportunities to influencers via instances of the influencer portal based on influencer profiles accessed via the influencer portal and opportunity metrics specified for opportunities by the brands via the brand portal. For example, for a influencer accessing a first instance of the influencer portal, the computer system can: prompt the influencer to provide influencer metrics including a number of followers (e.g., via a particular online platform), a demographic of followers, a type(s) of brand (e.g., sporting equipment, home goods), etc.; and calculate additional influencer metrics based on past opportunities including conversion rate, click-through rate, brand lift, ads viewed, etc.

In one variation, the computer system can update the influencer profile in near real time to reflect outcomes of advertisements generated by an influencer and served to users at computing devices. For example, in response to a user clicking on an advertisement generated by an influencer and purchasing the advertised product, the computer system can update a click-through metric for both the current opportunity and a total click-through metric for all opportunities selected by the influencer. In one implementation, the computer system can calculate a set of engagement metrics for each opportunity selected by the first influencer including: a number of advertisements generated for an opportunity; a number of times the influencer shared an advertisement; viewability of an advertisement; a number of clicks, swipes, scrolls, etc. on an advertisement; a number of click-throughs for the advertisement; a brand lift score; etc. Therefore, the computer system can track influencer performance data for advertising content generated by influencers who completed opportunities and leverage these data to update influencer profiles, such as in (near) real-time.

6. Opportunities

Generally, brands may specify opportunities defining advertising campaigns for the brands or for particular products associated with the brands via instances of a brand portal, and the computer system can receive these opportunities via instances of the brand portal and serve these opportunities to influencers via instances of the influencer portal. More specifically, the computer system can: receive a new opportunity from a particular brand via a first instance of a brand portal; receive a set of opportunity metrics defining characteristics of the new opportunity and target outcomes of advertisements associated with new the opportunity; sort the new opportunity into a catalog of opportunities based on the opportunity metrics; and serve the new opportunity to a subset of influencers via instances of the influencer portal based on the opportunity metrics.

In one variation, upon receiving a new opportunity from a brand via a first instance of the brand portal, the computer system can prompt the brand to input a set of opportunity parameters including: brand characteristics, product characteristics (e.g., for products associated with the new opportunity), a target outcome for advertisements associated with the new opportunity, size of an advertising campaign associated with the new opportunity, budget for the advertising campaign, and/or compensation rate for influencers. Additionally, the computer system can prompt the brand to input a set of influencer limitations including: presence on a particular online platform, a number of followers via the particular online platform, an average demographic of followers, a threshold performance metric (e.g., minimum click-through percentage for previous opportunities), etc. Based on the specified opportunity parameters and the influencer limitations, the computer system can: calculate a set of opportunity metrics representing the specified opportunity parameters; calculate an opportunity score by weighting opportunity metrics within the set of opportunity metrics; access a set of influencer profiles containing influencer scores representing influencer engagement metrics; and, in response to a influencer score falling within a threshold deviation from the opportunity score, prompt the influencer, via a first instance of the influencer portal, to record a first video advertisement for the opportunity.

7. Opportunity Gating

Once an opportunity has been received from an instance of the brand portal, the computer system can serve the opportunity to instances of the influencer portal. Based on a set of opportunity parameters defined by the brand, the computer system can sort the opportunity into a catalog that is searchable within the influencer portal. For example, an influencer may access the catalog at an instance of the influencer portal and select to view only a subset of opportunities contained in the catalog based on product type (e.g., "sports" or "home goods"). Alternatively, the influencer may access the catalog and select to view a different subset of opportunities based on user demographic (e.g., "athletes" or "parents"). Therefore, the computer system enables an influencer at an instance of the influencer portal to more quickly find opportunities relevant to that influencer and to sort opportunities based on preferences of the influencer.

In one implementation, the computer system can rank opportunities for each influencer and serve the opportunities to the influencers in this order. For example, upon receiving a set of new opportunities from instances of the brand portal, the computer system can: access influencer profiles to calculate match scores for each influencer with each opportunity in the set of opportunities; generate ranked opportunity catalogs for each influencer based on these match scores; and serve a ranked opportunity catalog to each influencer. The computer system can calculate match scores by comparing opportunity metrics to influencer metrics (e.g., product types, number of followers, demographic of followers). Alternatively, the computer system can calculate match scores by accessing a model linking opportunity metrics to influencer performance metrics (e.g., click-through conversion rate). Therefore, the computer system enables influencers to efficiently search and accept opportunities most relevant to them, while enabling brands to more efficiently access the most effective influencers for their brand.

In one variation, the computer system can rank all opportunities for each influencer and then serve different sets of opportunities to different influencers based on rank. For example, the computer system can rank all available opportunities for a particular influencer, and serve only the first ten opportunities—sorted by rank (e.g., by match score, based on a particular metric specified by the brand)—to the particular influencer, such as once per day.

Based on opportunity metrics specified by the brand for the opportunity, the computer system can weight the opportunity metrics to calculate opportunity scores. The computer system can weight the opportunity metrics based on specifications by the brand, or by implementing analysis techniques to determine which parameters are the best indicators of advertising outcomes. Additionally, an influencer score can be calculated from influencer metrics accessed at the influencer profile. The computer system can compare the opportunity score and the influencer score to generate an opportunity-influencer match score, indicative of the predicted probability of a certain target outcome. Opportunities can then be ranked and ordered by match scores and then served to instances of the influencer portal. Alternatively, the computer system can serve opportunities to instances of the influencer portal only where the match score exceeds a threshold match score.

In one variation, the computer system can serve the opportunity to influencers via instances of the influencer portal and implement a checkpoint after an influencer selects an opportunity. For example, the computer system can: receive a new opportunity from a brand via a first instance of the brand portal and calculate a set of opportunity metrics; distribute the new opportunity to a influencer via a first instance of the influencer portal; receive a first selection of the new opportunity from the influencer via the first instance of the influencer portal; serve an influencer profile associated with the influencer to the brand via the brand portal; in response to receiving a second selection of the influencer by the brand, prompt the influencer to record a first video advertisement for the new opportunity.

Alternatively, in one variation, the computer system can distribute specific influencer profiles to instances of the brand portal, thereby implementing the same/similar matching techniques. In this variation, the computer system can also enable brands to see influencers who may not meet all criteria (e.g., number of followers, desired pay-out, target demographic) defined by the brand in the opportunity metrics.

7.1 Selective Opportunity Distribution

In one variation, a particular brand may specify a new opportunity and the computer system can automatically push the opportunity to a target group of influencers. The computer system can receive the new opportunity and send the new opportunity to a first group of influencers based on characteristics of both the new opportunity and the group of influencers. For example, the computer system can: receive a new opportunity from a particular brand; calculate a set of opportunity metrics for the new opportunity based on characteristics of the new opportunity and target outcomes for advertisements associated with the new opportunity specified by the particular brand; access a catalog of influencer profiles defining a population of influencers and each including a set of influencer metrics; calculate predicted match scores between the population of influencers and the new opportunity; and, in response to the predicted match score for a particular influencer and the new opportunity exceeding a threshold match score, prompt the particular influencer to record a first video advertisement for the new opportunity via the influencer portal.

In one variation, the computer system can withhold particular opportunities from a particular influencer based on opportunity parameters specified by the brand. In particular, the computer system can: receive a new opportunity and a set of opportunity parameters from a brand via a first instance of a brand portal; sort the new opportunity into an opportunity catalog based on the specified opportunity parameters; calculate a predicted match score between a influencer and the new opportunity based on the opportunity metrics and a set of influencer metrics; and, in response to the predicted match score falling below a threshold match score, distributing a subset of opportunities, not containing the new opportunity, from the catalog of opportunities to a first instance of an influencer portal associated with the influencer.

In another variation, the computer system can withhold particular opportunities from a particular influencer based on influencer limitations set by the brand at the instance of the brand portal. For example, the computer system can receive an opportunity defining an influencer limitation of 50,000 followers on a particular online platform. Rather than calculate match scores for all opportunities and all influencers, the computer system can automatically withhold this opportunity from instances of the influencer portal in which the influencer has fewer than 50,000 followers on the particular online platform. Therefore, the computer system can: receive a set of opportunity metrics, defining a new opportunity, from a brand via an instance of a brand portal; access an influencer profile of a influencer via an instance of the influencer portal to determine whether a minimum criteria is met according to the opportunity metrics as defined by the brand; and, in response to the influencer failing to meet a particular opportunity metric, withhold the new opportunity from the influencer.

In another variation, the computer system can withhold particular opportunities from a particular influencer based on predefined influencer rules. For example, a particular brand may specify a new opportunity for a skin-care product. In response to an influencer recently or previously accepting an opportunity (e.g., generating advertisement content) for a different skin-care product of a different brand, the computer system can withhold this opportunity from an instance of the influencer portal associated with this influencer. Therefore, the computer system can implement influencer rules to automatically withhold opportunities from particular influencers that may lead to conflicts of interest (e.g., an influencer working with two different brands selling the same and/or similar products). For example, upon receiving an opportunity via an instance of the brand portal, the computer system can: receive a product type (e.g., characteristics of a product associated with the opportunity) for the opportunity; match the opportunity to a subset of influencers; access influencer history over a set previous period of time (e.g., 1 month, 6 months, 1 year) to check a product list for which advertising content was generated by the influencer; in response to a first influencer in the subset of influencers accepting an opportunity for a product of the same product type for a different brand within the set previous period of time, withhold the opportunity from the first influencer; and, in response to a second influencer in the subset of influencers accepting no opportunities for the same product type in the set previous period of time, prompt the second influencer to generate an advertisement for the opportunity.

7.2 Transparent Gating

In one variation, the computer system can compare opportunity metrics received from instances of the brand portal with influencer metrics to determine whether to serve a particular opportunity to an influencer. For example, a brand may specify a minimum number of online followers that an influencer must possess in order to select the opportunity. Therefore, if a particular influencer does not possess the minimum number of online followers specified by the brand, the computer system can hide this opportunity from the catalog via a particular instance of the influencer portal associated with the particular influencer. Alternatively, the computer system can serve a secondary set of opportunities to the particular influencer via the particular instance of the influencer portal including opportunities specifying opportunity metrics that may currently disqualify the influencer from selecting the opportunity, but that may be a match for the influencer in the future. For example, if a brand defines a new opportunity and specifies an influencer must have a minimum of 10,000 followers on a particular online platform, the computer system can serve this new opportunity to an influencer meeting other criteria for the opportunity but with only 90,000 followers in a secondary set of opportunities. Therefore, the computer system can enable influencers to see relevant opportunities that may be available in the future, thus providing incentives to influencers for improving influencer performance.

Alternatively, any influencer may connect with any opportunity regardless of relevancy of the influence to the hosting brand.

8. Opportunity Confirmation/Influencer Verification

In one variation, the computer system can implement a verification system to approve an influencer-opportunity match. The computer system can receive a selection of an opportunity from an influencer and pass an influencer profile of this influencer to a brand associated with the opportunity. The brand may then determine whether to select this particular influencer for the opportunity. Upon selection of the influencer by the brand, the computer system can notify the influencer of the match and provide additional brand and opportunity information (e.g., fact sheets, talking points) to the influencer to aid in advertising content creation.

In another variation, the computer system can implement an automatic verification system to approve influencer-opportunity matches. For example, if an influencer-opportunity score falls above an upper threshold score, the computer system can automatically prompt the influencer to record an advertisement for the opportunity, and distribute advertisement content generation tools/materials to the influencer, and therefore bypass verification from the brand. Alternatively, the computer system can automatically approve any influencer-opportunity match with a match score higher than a threshold match score.

9. Opportunity Models

In one variation, the computer system can access a model linking opportunity metrics (e.g., product type and/or target outcome) to influencer performance (e.g., click-through conversion rate for opportunities) to automatically serve opportunities to the most qualified influencers for each opportunity. The computer system can develop this model by serving advertising content generated by a first group of influencers for various types of brands to a first group of users, and recording outcome data (e.g., click-through conversions, viewability, brand lift) resulting from serving these advertisements to the first group of users. The computer system can learn correlations between characteristics of the advertising content and characteristics of the influencers who lead to particular advertising outcomes, and implement analysis techniques (e.g., linear regression, artificial intelligence) to develop an opportunity model for predicting outcomes of influencer-opportunity matches. As more advertising content is generated from these influencer-opportunity matches, the computer system can continually update the opportunity model to refine predictions. For example, the computer system can determine that product type is the most important opportunity metric for predicting outcomes of influencer-opportunity matches. Therefore, the product type metric may be weighted higher in the opportunity model than other opportunity metrics when predicting match scores.

Alternatively, the computer system can develop and refine an opportunity model for each influencer rather than an opportunity model for the influencer population. In this variation, the computer system can initially access the general opportunity model to serve opportunities to a particular influencer, and then refine the opportunity model for this influencer as more advertising content is generated by this particular influencer and additional outcome data for advertisements associated with this particular influencer is available.

In one variation, the computer system implements the opportunity model to automatically identify influencers who match parameters of an opportunity published by the brand. For example, when the computer system serves an opportunity to an influencer, it can also calculate a predicted outcome (e.g., click-through conversion rate) for advertisement content generated by the influencer for this opportunity. Upon receiving an influencer's acceptance of the opportunity, the computer system can also serve this predicted outcome to the instance of the brand portal, thus enabling both the brand and the influencer to consider predicted outcomes before engaging in advertisement content creation.

Additionally or alternatively, the computer system can predict an opportunity value representative of predicted value (e.g., income, increase in influencer reach) the influencer may derive from an opportunity and distribute this opportunity value to the influencer at the instance of the influencer portal. For example, the computer system can calculate a predicted opportunity value for the influencer including influencer compensation (e.g., where compensation to the influencer is based on the outcome, such as proportional to a total quantity of conversions via a resulting augmented video advertisement). Therefore, the computer system can enable the influencer to consider a predicted value of this opportunity before accepting the opportunity.

10. Content Creation & Packaging

Generally, once an influencer has selected an opportunity and the influencer has been confirmed by the brand associated with the opportunity, the computer system can distribute brand content to the influencer via an instance of the influencer portal to enable the influencer to record visual content. More specifically, the computer system can: receive a selection of an opportunity via an instance of the influencer portal; receive content generation tools (e.g., product fact sheets, graphics for incorporation in visual content, tip sheets including "talking points") from an instance of the brand portal associated with the opportunity; and distribute these content generation tools to the instance of the influencer portal to enable advertising content generation by the influencer. Additionally, the computer system can enable "chat windows" between brands and influencers to further facilitate advertising content generation. Upon receiving visual advertising content from the influencer via the instance of the influencer portal, the computer system can prepare the advertisement for publication within an online destination and distribute the advertisement to the influencer portal and/or brand portal. Therefore, the computer system can enable communication between brands and influencers via their respective portals, thus enabling influencer-brand connection, communication, advertising content generation, and advertisement distribution to occur via the influencer and brand portals.

In one variation, the computer system can: receive visual content recorded by the influencer and uploaded via an instance of the influencer portal; package the visual content with a pointer to the influencer to generate a first video advertisement; and distribute the first video advertisement to the instance of the influencer portal, the instance of the brand portal, and/or to an ad server for distribution within online destinations. In one variation, the computer system can generate an advertisement including a checkout portal, enabling in video checkout of advertised products. For example, users viewing these advertisements on websites or native applications of a computing device can interact with an advertisement (e.g., click, swipe) and the computer system can display a checkout portal in a viewing window of the mobile device for the user to complete a purchase of the advertised product.

In one variation, once the advertising content is received, the computer system can wrap the advertisement with additional features to generate the advertisement. The advertisement can include: a checkout portal; a pointer to the advertised product, distribution, warehousing company, brand, etc.; a pointer to a bank account; a pointer to the influencer; and advertising content generated by the influencer.

Upon packaging the checkout portal, the pointer, and/or other features into the advertisement, the computer system can return the packaged advertisement (hereinafter the "augmented video advertisement") to the influencer, brand, and/or any other entity (e.g., third-party entity) for sharing the augmented video advertisement online. The computer system can then return the augmented video advertisement to the influencer (and/or to the brand) in the form of a video file or as a hyper-link (e.g., URL). The influencer (and/or the brands) may then post this video file or the hyper-link to online platforms and networks on which other users may view the augmented video advertisement and access the checkout portal.

Regardless of the entity sharing the augmented video advertisement or the link, the computer system can attribute purchases or other outcomes to the appropriate influencer or content creator based on the pointer. Therefore, the computer system ensures that each instance of an augmented video advertisement, at each online platform, and shared by any entity, is associated with the original influencer responsible for generating the advertising content. Thus, the computer system enables influencers to directly measure their value and reach for each opportunity accepted by these influencers.

10.1 Checkout Portal—Purchases

Figure 1:
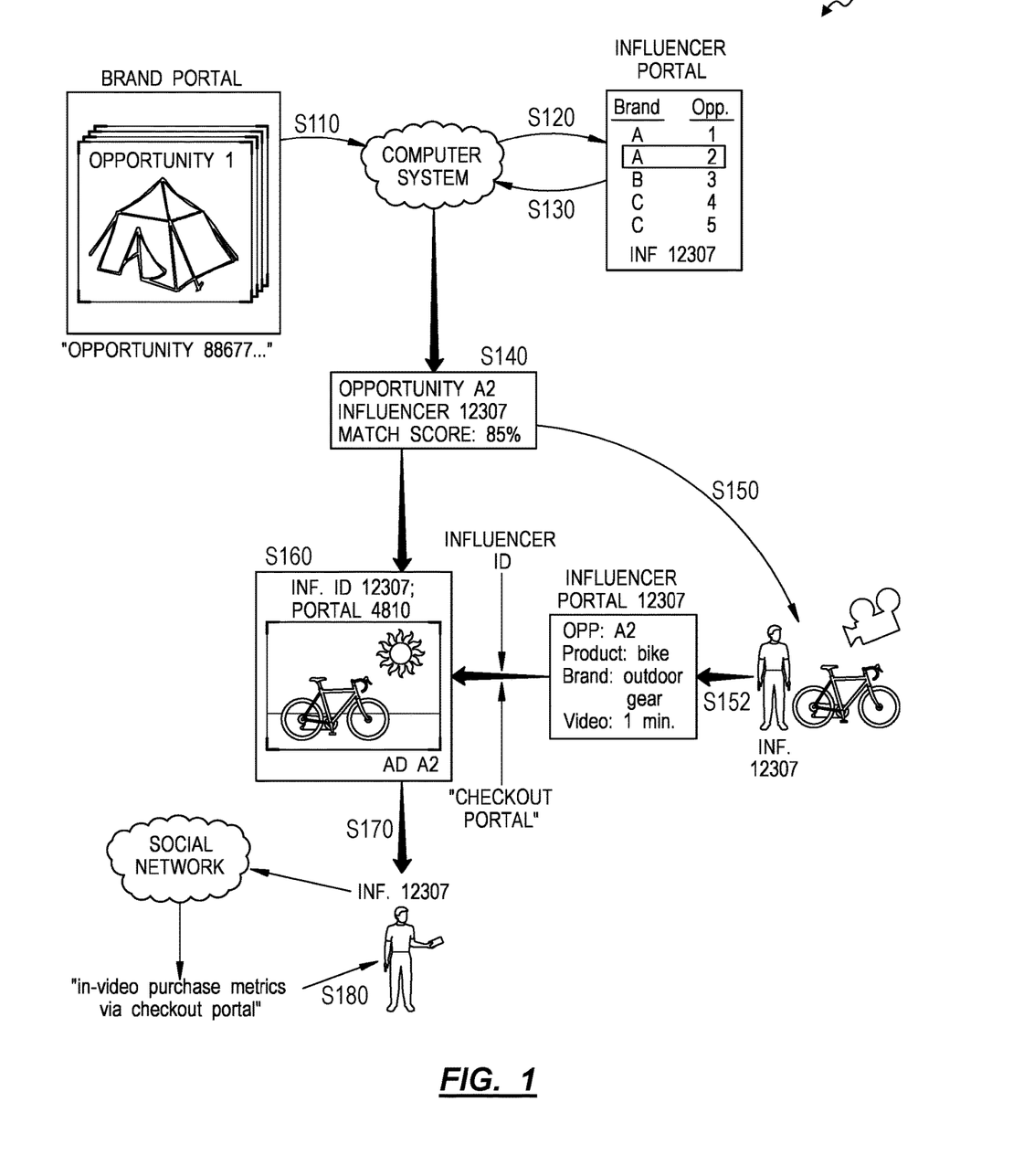
FIG. 1 is a flowchart representation of a method.
Figure 2:
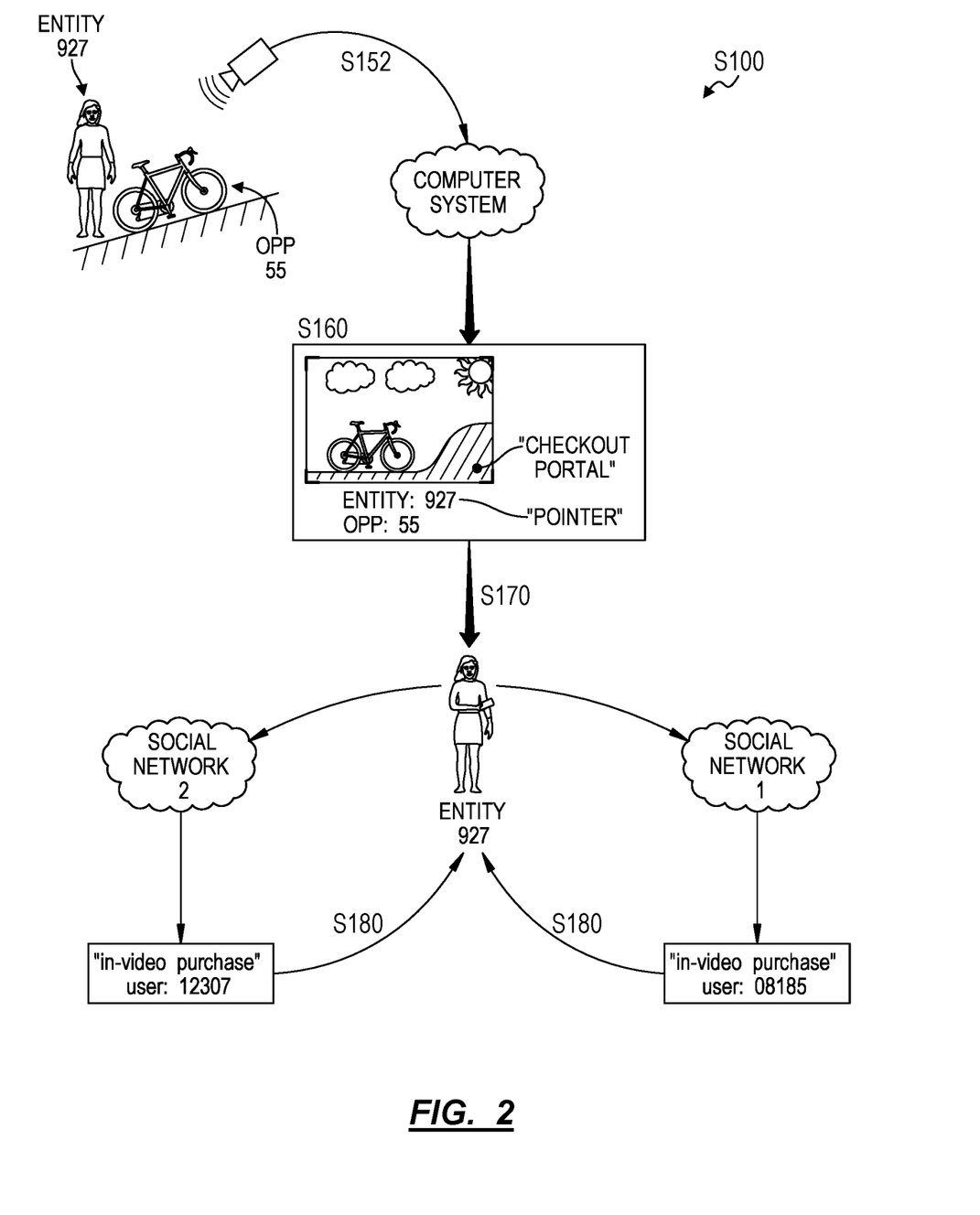
FIG. 2 is a flowchart representation of one variation of the method.
Figure 3A:
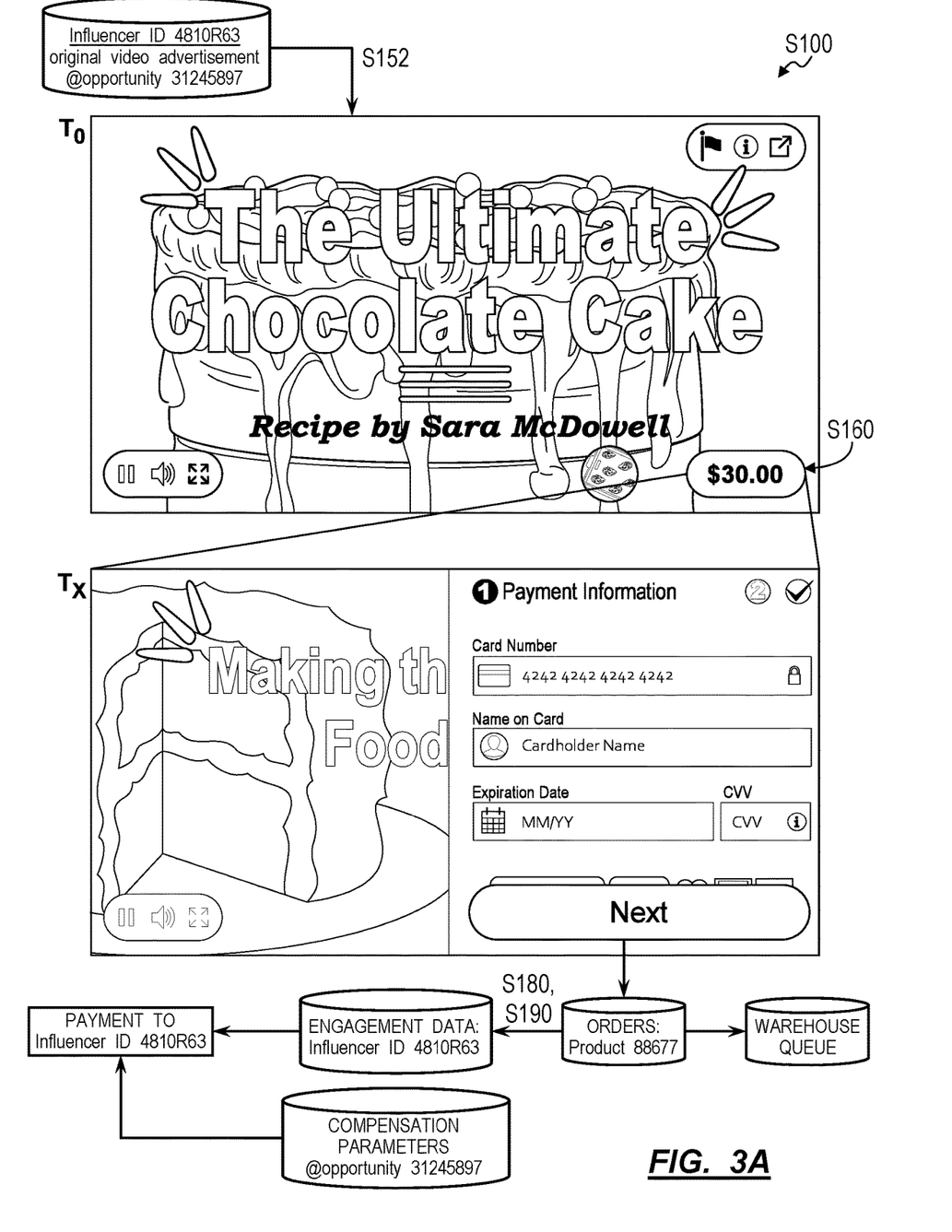
FIGS. 3A and 3B are schematic representations of an augmented video advertisement according to one variation of the method.
Figure 3B:
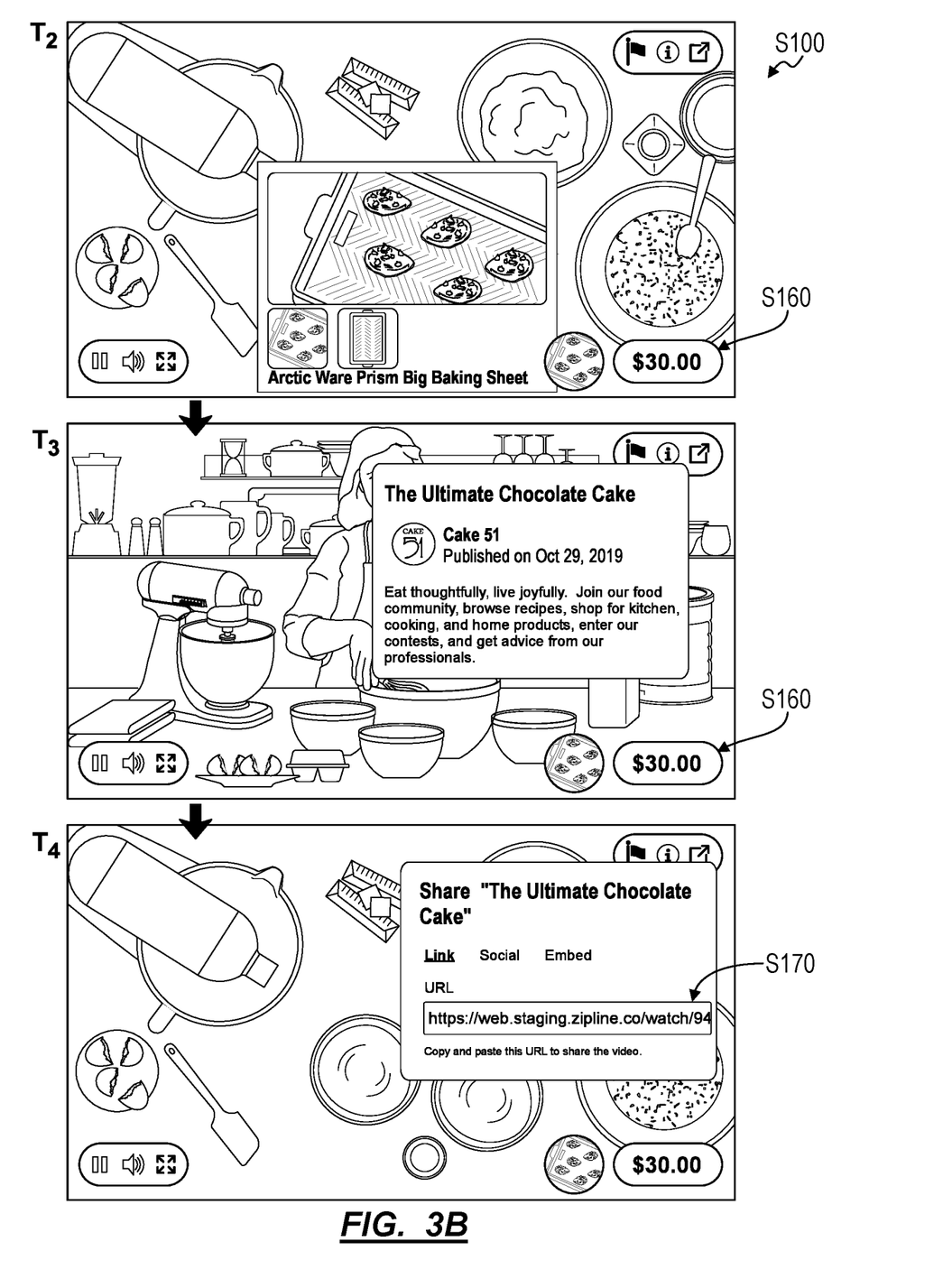
Figure 4:
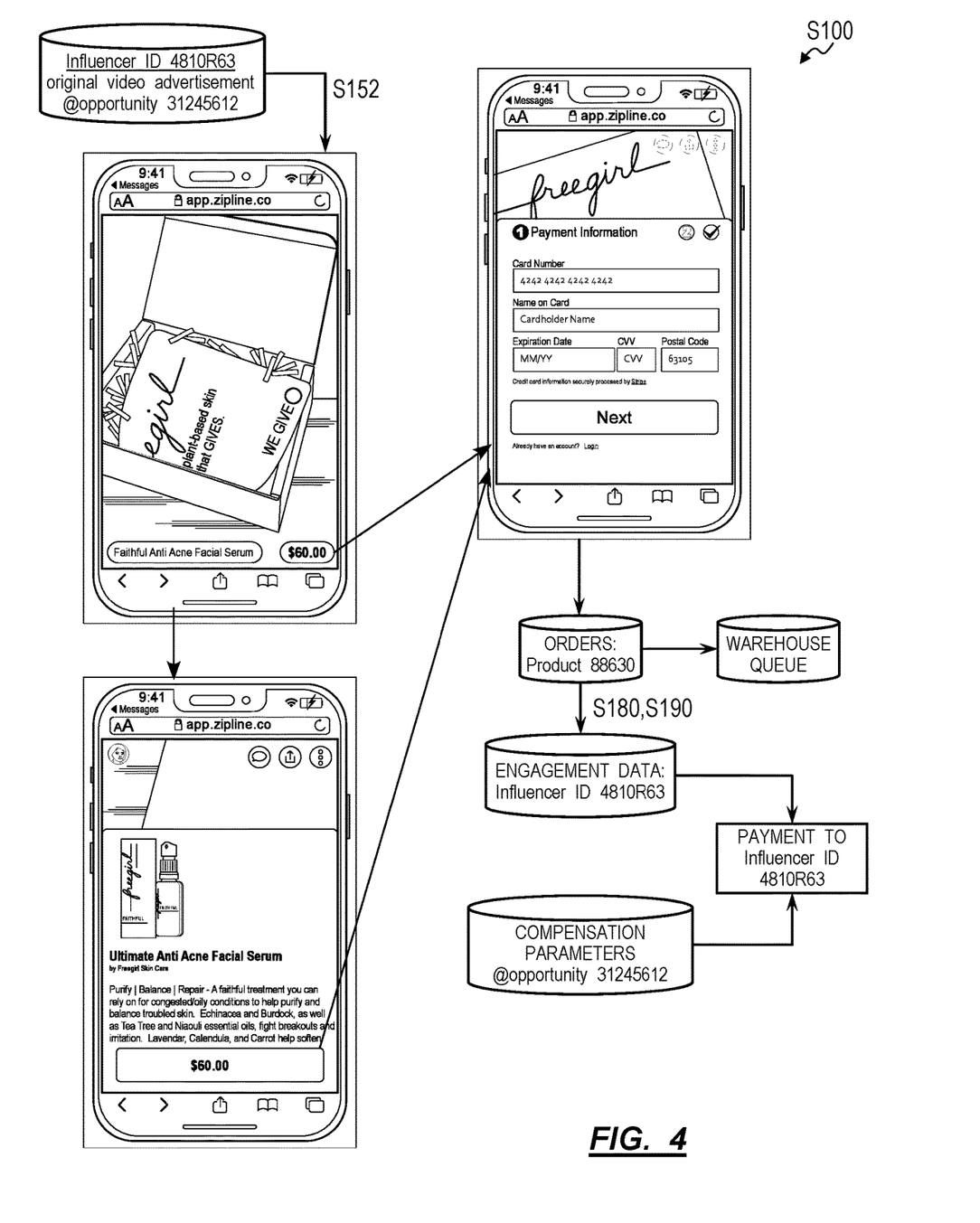
FIG. 4 is a schematic representation of a checkout portal according to one variation of the method.

The computer system can package a video advertisement with a checkout portal for content linked to the video advertisement. As shown in FIGS. 3A, 3B, and 4, when a user indicates she wishes to purchase a product advertised in the video advertisement (e.g., by gesturing over the video advertisement), the computer system can display the checkout portal and initiate a checkout process for the user within the checkout portal.

For example, during a content creation period, the computer system can: receive a video advertisement from a first entity (e.g., influencer, content creator); and package the video advertisement with a pointer to the first entity and a checkout portal for content linked to the video advertisement to generate an augmented video advertisement. Later, during a live period succeeding the content creation period, in response to a completed purchase by a user within the checkout portal, the computer system can associate this completed purchase with the first entity based on the pointer.

In one variation, the computer system can overlay the checkout portal over a portion of the video advertisement, such that the portion of the video advertisement is visible to a user throughout the checkout process at the checkout portal.

During the checkout process, within the checkout portal, the computer system can prompt the user to input purchasing information such as: user name; credit card information; billing address; shipping address; etc.

In one variation, within the checkout portal, the computer system can prompt the user to specify product selections. For example, for a video advertisement for winter gear accessories, the computer system can prompt the user to input a set of product selections including: a type of winter gear (e.g., hat, gloves, scarf); a size (e.g., women's S/M/L, men's S/M/L); a color preference (e.g., white, black, gray); etc. Additionally, the computer system can prompt the user to input user information and payment details for completing a purchase. Thus, the computer system can execute complete transactions including selection of products and recovery of payment at the checkout portal within the advertisement.

10.2 Visual Element—Engagement Data

Before returning the augmented video advertisement to the influencer, the computer system can also package the video advertisement with a visual element configured to record interactions (e.g., view durations, clicks, scrolls) of a user viewing the augmented video advertisement. The computer system can then leverage these recorded interactions to estimate engagement data (e.g., viewability, click-through rate, brand lift) for this user and all other users interacting with the augmented video advertisement. Additionally, the computer system can return this engagement data to the brand associated with the augmented video advertisement in (near) real-time and thus enable brands to make decisions related to these augmented video advertisements throughout an advertising campaign. Further, the computer system can return this engagement data to the influencer responsible for creating the augmented video advertisement, such that each user interaction (e.g., view, click, scroll, purchase) and the associated engagement data for this augmented video advertisement is directly attributed to this influencer. The computer system can store this engagement data at the influencer profile thus enabling the influencer to clearly derive a value of her work to brands and/or modify or strengthen aspects of her work based on this engagement data.

10.3 Interactive Features

In one variation, as shown in FIGS. 3A and 3B, in addition to the pointer to the influencer and the checkout portal, the computer system can package the advertisement with features configured to engage the user with the augmented video advertisement, the brand associated with the augmented video advertisement, and/or the influencer. The computer system can display these features within or over the augmented video advertisement responsive to user inputs. For example, the computer system can receive a video advertisement, from an influencer, associated with a brand, and package the video advertisement with a set of features including a pointer to the influencer and a checkout portal. Further, before distributing the augmented video advertisement back to the influencer, the computer system can package the video advertisement with additional features such as: an influencer feature configured to introduce a user to the influencer and/or direct a user to a first external destination (e.g., website, profile) associated with the influencer; a brand feature configured to introduce the user to the brand and/or direct the user to a second external destination associated with the brand; a product feature configured to communicate details of a product advertised in the augmented video advertisement; additional features configured to generate user interest in the product or content of the augmented video advertisement; etc. For example, for a video advertisement for a baking sheet, the computer system can package the video advertisement with a set of "pop-ups" configured to display over the augmented video advertisement responsive to user inputs, the set of "pop-ups" including: a cookie recipe curated by the influencer; a brief description and link to the influencer's baking blog; a brief description of the cookie sheet; and a brief description of similar products with a link to a webpage of the brand's baking products.

To enable user access to these features, the computer system can overlay the video advertisement with a set of icons configured to receive user inputs (e.g., clicks, swipes, gestures). For example, the computer system can overlay the video advertisement with a first icon configured to: receive a click input from the user; and trigger activation of the checkout portal responsive to the click input. Thus, in response to receiving a click input from the user at the first icon, the computer system can display the checkout portal to the user. The computer system can overlay the video advertisement with additional icons configured to receive inputs from the user and trigger activation of additional features (e.g., "pop-ups").

11. Transactions

In one variation, the computer can process transactions between users viewing the advertisements and the brands advertising their products. For example, the computer system can: in response to a user input on the advertisement at a computing device, overlay a checkout portal over a portion of the advertisement; receive inputs from the user for completing the transaction (e.g., user name, credit card information, user address); and distribute the inputs from the user to the instance of the brand portal associated with the advertisement. Therefore, the computer system can process the financial transaction and distribute the information back to the brand for preparing and delivering the order to the user. Additionally, upon completing the transaction, the computer system can check the pointer included in the advertisement to determine the influencer associated with the advertisement and update this influencer profile to include this transaction.

In one implementation, the computer system can prompt a user to store their information for future purchases. Additionally, the computer system can store a user's personal information so that a user may complete a purchase with a single input at the computing device associated with the user. For example, in response to a vertical swipe by the user across an advertisement rendered on the user's computing device, the computer system (or the user's computing device, or the packaged advertisement) can: access this user's stored information (e.g., name, credit card information, address); automatically process a transaction representing a purchase of a unit of the product advertised in the advertisement; distribute the user and transaction information to the instance of the brand portal associated with the product; and, notify the user of the received transaction, all while the advertisement is still visible in a viewing window of the user's computing device.

12. Advertising Campaign

The computer system enables brands to advertise content across a myriad of online platforms (e.g., social media networks, a native platform, a mobile application) and directly attributes engagement metrics (e.g., clicks, scrolls, views, purchases, conversions) to particular advertisements, brands, and influencers. Additionally, the computer system can enable brands to advertise content by matching brands with particular entities (e.g., influencers, content creators) who fit certain criteria for advertising these products and who may therefore influence users more likely to perform target outcomes (e.g., conversion, brand lift) specified by these brands.

For example, a brand (e.g., a brand representative) may access an instance of a brand portal (e.g., via a computing device) and generate a brand profile. The computer system can prompt the brand to input a first opportunity (e.g., an advertising opportunity). Additionally, the computer system can prompt the brand to input opportunity parameters for the first opportunity, such as characteristics of a product associated with the opportunity and/or a target outcome (e.g., minimum conversion rate).

Further, the computer system can prompt the brand to input preferences related to influencer characteristics (or "influencer limitations"). Based on this information, the computer system can generate a list of influencers matched for the first opportunity and distribute this list to the brand at the instance of the brand profile. Thus, the computer system enables the brand to filter through a population of influencers and find a subset of influencers best for the first opportunity as defined by the brand.

Additionally or alternatively, the computer system can enable selection of the opportunity by influencers via corresponding instances of the influencer portal. The computer system can notify the brand—at an instance of the brand portal—if an influencer selects the first opportunity and prompt the brand to approve or deny a match with the influencer.

Upon matching with an influencer, the computer system can prompt the brand to provide materials to the influencer to aid in content creation by the influencer. For example, the computer system can host direct communications between the brand and the influencer via corresponding instances of the brand and influencer portals. The influencer may then incorporate this content into a new video advertisement featuring the brand or a product specified by the first opportunity.

Once the influencer has recorded and uploaded this video advertisement for the first opportunity, the computer system can package the video advertisement—with a checkout portal and pointer to the influencer and to the brand—to generate an augmented video advertisement. The computer system can then return this augmented video advertisement to the influencer, who may then post (or "share") the augmented video advertisement across various online platforms or networks. Additionally or alternatively, the computer system can present the augmented video advertisement to the brand via the brand portal, and the brand (e.g., the brand representative) may similarly post the augmented video advertisement across the same or other online platforms or networks.

As the augmented video advertisement is posted onto online platforms or networks, the computer system can: track engagement data for each instance of the augmented video advertisement viewed by a population of users; associate these engagement data with the brand and the influencer according to brand and influencer pointers stored in the augmented video advertisement; and return these engagement data back to the brand (e.g., via the corresponding instance of the brand portal). More specifically, the computer system can leverage the brand pointer stored in the augmented video advertisement to link each instance of the augmented video advertisement—viewed across various online platforms and networks—back to the brand, regardless of whether the brand, the influencer, or another user posted or shared this augmented video advertisement, thereby enabling the brand to track engagement (e.g., views, view durations, clicks, scrolls, purchases) with this augmented video advertisement over time. (The computer system can similarly leverage the influencer pointer stored in the augmented video advertisement to link each instance of the augmented video advertisement—viewed across various online platforms and networks—back to the influencer who generated the video advertisement, enable the influencer to access these engagement data, and/or automatically distribute compensation to the influencer according to these engagement data.)

For example, if a user makes a purchase of a product within an instance of the augmented video advertisement, the computer system can record: a location of the user; a time of day; an online platform at which the user viewed the augmented video advertisement; advertisement metadata; and/or an operating system of the user's device. The computer system can then store these data in association with the augmented video advertisement, the brand, and the influencer. By repeating this process for each view of and/or purchase through the augmented video advertisement and aggregating these data for the augmented video advertisement, the brand, and/or the influencer, the computer system can enable the brand to track progression of this augmented video advertisement (or a greater advertising campaign including this augmented video advertisement) over time.

The computer system can also directly correlate these engagement metrics (e.g., views, purchases) recorded at instances of the augmented video advertisement to the particular augmented video advertisement, the product specified in the opportunity associated with the augmented video advertisement, and/or the influencer who generated the augmented video advertisement.

Additionally, upon purchases within instances of the checkout portal packaged within the augmented video advertisement, the computer system can process payments from users and directly allocate a portion of payments to the brand based on the pointer and allocate an additional portion of payments to the appropriate influencer on behalf of the brand.

Therefore, the computer system enables the brand to track engagement and conversion data for an augmented video advertisement generated and published on behalf of the brand—but not generated or solely published by the brand itself—over time and adjust an advertising campaign related to the augmented video advertisement accordingly. Thus, the computer system enables brand access to engagement and conversion data extracted from user interactions with augmented video advertisements generated by a third party other than the brand but otherwise presenting products and content related to the brand.

11.1 Advertising Campaign Updates

Later, upon completion of the advertising campaign, expiration of an engagement between the influencer and the brand, expiration of a specified duration of the corresponding opportunity, or lack of further availability of the product presented in the augmented video advertisement, the computer system can disable the checkout portal within all instances of the augmented video advertisement shared on any online platforms and networks. For example, the brand may specify an active duration (e.g., days, weeks) of an augmented video advertisement generated according to an opportunity. Thus, once the augmented video advertisement is first posted to an online platform or network, the computer system can enable purchases within instances of the augmented video advertisement for the active duration and then disable purchases within instances of the augmented video advertisement once the active duration expires. In another example, the brand may specify an end date of the advertising campaign associated with the opportunity. Thus, the computer system can enable purchases within instances of the augmented video advertisement—associated with the advertising campaign—until the scheduled end data of the advertising campaign. (However, the computer system can continue to record engagement data for the augmented video advertisement and return these engagement data to the brand (long) after the active duration expires or the advertising campaign concludes.)

Similarly, the computer system can access pricing updates for the product depicted in the augmented video advertisement over time. Accordingly the computer system can update the augmented video advertisement and/or the checkout portal within the augmented video advertisement to reflect changes in pricing of the product depicted in the augmented video advertisement.

13. Virtual Wallet

In one variation, the computer system can host a virtual wallet and handle compensation—such as in the form of financial transactions with fiat currency or in the form of brand discounts—between influencers and brands based on perforated of advertisements published by these influencers and linked to opportunities posted on the platform by these brands. In this variation, an influencer can link financial account information to her influencer profile on the platform, and the computer system can automatically distribute compensation from a brand's financial account to the influencer's account—such as in real-time or upon conclusion of an advertisement campaign or opportunity period—based on views, click-throughs, and/or purchases within an advertisement published by the influencer for an opportunity associated with the brand.

In one variation, the computer system can directly distribute compensation to both influencers and brands for transactions occurring within advertisements generated by these influencers and published across many platforms. For example, for a first video advertisement received from a first influencer and associated with a first brand, the computer system can package the video advertisement with a set of features to generate an augmented video advertisement, the set of features including: a first pointer to the first influencer; a second pointer to the first brand; and a checkout portal for content linked to the video advertisement. Later, during a live period (e.g., once the augmented video advertisement has been shared across digital platforms), the computer system can: for a first purchase at a first instance of the augmented video advertisement, associate the first purchase with the first influencer and the first brand based on the first and second pointer; calculate a first proportion of the first purchase corresponding to the first influencer; calculate a second proportion of the first purchase corresponding to the first brand; and distribute the first proportion and the second proportion to the first influencer and the first brand accordingly.

14. User Experience

The computer system enables users to make purchases within the augmented video advertisement (e.g., without redirecting users to an external location or website). For example, a user may view an augmented video advertisement while scrolling through an online social-networking platform on her computing device, and the user may wish to purchase a product advertised in the augmented video advertisement. The computer system can: receive a user input (e.g., click, swipe, gesture) over a first icon rendered over the augmented video advertisement; responsive to the user input, display a checkout portal packaged with the augmented video advertisement configured to receive user and purchase information (e.g., user name, address, payment details, product details); continue playing the augmented video advertisement in the background while displaying the checkout portal; and confirm purchase of the product and direct purchase information to an appropriate destination (e.g., brand portal, brand warehouse). Therefore, the computer system enables the user to complete purchases of products at the original advertisement, without redirecting the user to a second location to complete the purchase. In completing transactions at the augmented video advertisement, the computer system promotes a better experience for the user by: minimizing duration to completion of a purchase; eliminating inability to navigate to a second location; and eliminating difficulty in finding the product at the second location.

Thus, by minimizing effort required by the user to complete transactions, the computer system promotes increased conversion, which can be directly attributed to the appropriate influencer.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for generating advertising content between brands and brand influencers comprises:
   during a matching period:
      receiving a set of opportunities from brands at instances of a brand portal;
      in response to receiving selection of a first opportunity, in the set of opportunities, from a first influencer, in a population of influencers, at an instance of an influencer portal executing on a computing device accessed by the first influencer, based on characteristics of the first opportunity and the first influencer:
         generating a prompt to record a video advertisement for the first opportunity; and
         transmitting the prompt to the first influencer at the instance of the influencer portal;
   during a content creation period succeeding the matching period, in response to receiving the video advertisement from the first influencer, packaging the video advertisement with a set of features to generate an augmented video advertisement, the set of features comprising:
      a pointer to the first influencer; and
      a checkout portal for purchasing content associated with the video advertisement within the augmented video advertisement; and
   during a live period succeeding the content creation period;
      for a first instance of the augmented video advertisement accessed at a first online platform executing on a first computing device:
         rendering a first instance of the checkout portal within the first instance of the augmented video advertisement at the first online platform; and
         in response to a first purchase completed by a first user within the first instance of the checkout portal, associating the first purchase with the first influencer based on the pointer; and
      for a second instance of the augmented video advertisement accessed at a second online platform executing on a second computing device:
         rendering a second instance of the checkout portal within the second instance of the augmented video advertisement at the second online platform; and
         in response to a second purchase completed by a second user within the second instance of the checkout portal, associating the second purchase with the first influencer based on the pointer.

2. The method of claim 1, wherein generating the prompt to record the video advertisement based on characteristics of the first opportunity and the first infrastructure comprises:
   accessing a set of influencer characteristics from a first influencer profile, in a population of influencer profiles, corresponding to the first influencer;
   accessing a set of opportunity characteristics defined by the first opportunity;
   calculating a first score for the first influencer paired with the first opportunity based on the set of influencer characteristics and the set of opportunity characteristics; and
   based on the first score, generating the prompt to record the video advertisement.

3. The method of claim 1, further comprising:
   receiving a set of content generation tools from an instance of the brand portal associated with the first opportunity; and
   wherein generating the prompt to record the video advertisement comprises generating the prompt to record the video advertisement and comprising the set of content generation tools.

4. The method of claim 1, further comprising, in response to completion of the first purchase:
   calculating a set of attribution scores based on a value of the first purchase, the set of attribution scores comprising an influencer attribution score and a brand attribution score;
   storing the influencer attribution score at an influencer wallet associated with the first influencer based on the pointer; and
   storing the brand attribution score at a brand wallet associated with a brand affiliated with the first opportunity.

5. The method of claim 1:
   wherein packaging the video advertisement with the pointer and the checkout portal further comprises packaging the video advertisement with a set of icons overlaid the video advertisement and configured to receive user inputs; and
   wherein rendering the first instance of the checkout portal comprises, in response to receiving a first user input over a first icon, in the set of icons, rendering the first instance of the checkout portal at the first instance of the augmented video advertisement.

6. The method of claim 1, further comprising:
   packaging the augmented video advertisement with a visual element configured to record user interactions with the augmented video advertisement; and
   calculating a set of engagement metrics for the augmented video advertisement based on user interactions with the augmented video advertisement recorded by the visual element.

7. The method of claim 6:
   wherein calculating the set of engagement metrics comprises calculating a first set of engagement metrics for the first instance of the augmented video advertisement based on a first set of interactions between the first user and the first instance of the augmented video advertisement, the first set of interactions recorded by a first instance of the visual element at the first instance of the augmented video advertisement; and further comprising:
in response to termination of the first instance of the augmented video advertisement, returning the first set of engagement metrics to a first brand associated with the first opportunity; and
associating the first set of engagement metrics with the first influencer based on the pointer.

8. The method of claim 7:
wherein calculating the first set of engagement metrics comprises calculating a viewability metric; and
wherein associating the first set of engagement metrics with the first influencer comprises:
associating the viewability metric with the first influencer based on the pointer; and
updating an influencer profile associated with the first influencer based on the viewability metric.

9. A method for generating advertising content comprises:
during a matching period:
receiving a set of opportunities from brands at instances of a brand portal;
serving the set of opportunities to a first influencer, in a population of influencers, at an instance of an influencer portal based on characteristics of the set of opportunities;
in response to receiving selection of a first opportunity, in the set of opportunities, from the instance of the influencer portal:
generating a prompt to record a video advertisement for the first opportunity; and
transmitting the prompt to the first influencer at the first instance of the influencer portal;
during a content creation period succeeding the matching period, in response to receiving the video advertisement from the first influencer, packaging the video advertisement with a set of features to generate an augmented video advertisement, the set of features comprising:
a pointer to the first influencer;
a checkout portal for purchasing content associated with the first opportunity within the augmented video advertisement; and
a visual element configured to track user interactions with the augmented video advertisement; and
during a live period succeeding the content creation period, for a first instance of the augmented video advertisement accessed at a first online platform executing on a first computing device, associating a first advertising outcome with the first influencer based on the pointer, the first advertising outcome derived from a first set of user interactions recorded by a first instance of the visual element rendered within the first instance of the augmented video advertisement at the first online platform.

10. The method of claim 9, wherein associating the first advertising outcome with the first influencer based on the pointer comprises associating a measured brand lift outcome associated with the video advertisement with the first influencer based on the pointer.

11. The method of claim 9:
wherein associating the first advertising outcome with the first influencer based on the pointer comprises associating a first purchase within a first instance of the checkout portal with the first influencer based on the pointer, the first instance of the checkout portal rendered within the first instance of the augmented video advertisement rendered within the first online platform.

12. The method of claim 9, further comprising, during the content creation period:
preparing the augmented video advertisement for publication to an online platform; and
transmitting the augmented video advertisement to the first influencer, at the first instance of the influencer portal, for publication.

13. The method of claim 9, further comprising, during the live period, for a second instance of the augmented video advertisement accessed at a second online platform executing on a second computing device, associating a second advertising outcome with the first influencer based on the pointer, the second advertising outcome derived from a second set of user interactions recorded by a second instance of the visual element rendered within the second instance of the augmented video advertisement at the second online platform.

14. The method of claim 13:
wherein associating the first advertising outcome with the first influencer comprises linking the first advertising outcome to a first influencer profile, in a population of influencer profiles, associated with the first influencer;
wherein associating the second advertising outcome with the first influencer comprises linking the second advertising outcome to the first influencer profile; and
further comprising, during the live period:
returning the first advertising outcome to a first brand, associated with the first opportunity, at a first instance of the brand portal; and
returning the second advertising outcome to the first brand at the first instance of the brand portal.

15. The method of claim 13:
wherein associating the first advertising outcome with the first influencer based on the pointer comprises associating a first viewability outcome with the first infrastructure based on the pointer; and
wherein associating the second advertising outcome with the first influencer based on the pointer comprises associating a second viewability outcome with the first influencer based on the pointer.

16. The method of claim 9, wherein generating the prompt to record the video advertisement comprises:
accessing a set of opportunity characteristics defined for the first opportunity by a brand associated with the first opportunity, the set of opportunity metrics comprising a target outcome for the first opportunity; and
accessing a set of engagement data stored in an influencer profile, in a population of influencer profiles, associated with the first influencer, the set of engagement data representing historical outcomes of opportunities completed by the first influencer;
calculating a score for the first influencer paired with the first opportunity based on the target outcome and the set of engagement data; and
in response to the score exceeding a threshold score, generating the prompt to record the video advertisement.

17. A method for generating advertising content between brands and brand influencers comprises:
during a content creation period, in response to receiving a video advertisement from a first influencer, packaging the video advertisement with a set of features to generate an augmented video advertisement, the set of features comprising:
- a pointer configured to link instances of the augmented video advertisement to the first influencer; and
- a checkout portal for purchasing content, associated with the video advertisement, within the augmented video advertisement; and during a live period succeeding the content creation period, at a first instance of the augmented video advertisement accessed at a first online platform executing on a first computing device accessed by a first user:
- in response to receiving a first user input over the first instance of the augmented video advertisement, rendering a first instance of the checkout portal within the first instance of the augmented video advertisement at the first online platform; and
- in response to receiving confirmation of a first purchase completed by the first user within the first instance of the checkout portal, associating the first purchase with the first influencer based on the pointer.

18. The method of claim 17, further comprising, during the live period, at a second instance of the augmented video advertisement accessed at a second online platform executing on a second computing device accessed by a second user:
- in response to receiving a second user input over the second instance of the augmented video advertisement, rendering a second instance of the checkout portal within the second instance of the augmented video advertisement; and
- in response to receiving confirmation of a second purchase completed by the second user within the second instance of the checkout portal, associating the second purchase with the first influencer based on the pointer.

19. The method of claim 17:
- wherein packaging the video advertisement with the pointer and the checkout portal further comprises packaging the video advertisement with a set of icons overlaid the video advertisement and configured to receive user inputs; and
- wherein rendering the first instance of the checkout portal in response to receiving the first user input over the first instance of the augmented video advertisement comprises, in response to receiving the first user input over a first icon, in the set of icons, overlaid the video advertisement, rendering the first instance of the checkout portal at the first instance of the augmented video advertisement.

20. The method of claim 17, further comprising, during a matching period preceding the content creation period:
- receiving a set of opportunities from brands at instances of a brand portal; and
- in response to receiving selection of a first opportunity, in the set of opportunities, from a first influencer, in a population of influencers, at an instance of an influencer portal executing on a computing device accessed by the first influencer:
  - calculating a first score for the first opportunity paired with the first influencer based on characteristics of the first opportunity and the first influencer;
  - in response to the first score exceeding a threshold score:
    - generating a prompt to record the video advertisement for the first opportunity; and
    - transmitting the prompt to the first influencer at the instance of the influencer portal.

21. The method of claim 20, wherein calculating the first score for the first opportunity and the first influencer in response to receiving selection of the first opportunity comprises:
- in response to receiving the set of opportunities, serving a subset of opportunities, in the set of opportunities and comprising the first opportunity, to the first influencer based on the set of influencer characteristics; and
- in response to receiving selection of the first opportunity, in the subset of opportunities served to the first influencer:
  - accessing a population of influencer profiles corresponding to the population of influencers;
  - extracting a set of influencer characteristics from a first influencer profile, in the population of influencer profiles, corresponding to the first influencer; and
  - calculating the first score based on the set of influencer characteristics and characteristics of the first opportunity.

\* \* \* \* \*